March 31, 1931. C. D. PAPPAS 1,798,382
TRAP
Filed May 12, 1930 2 Sheets-Sheet 1
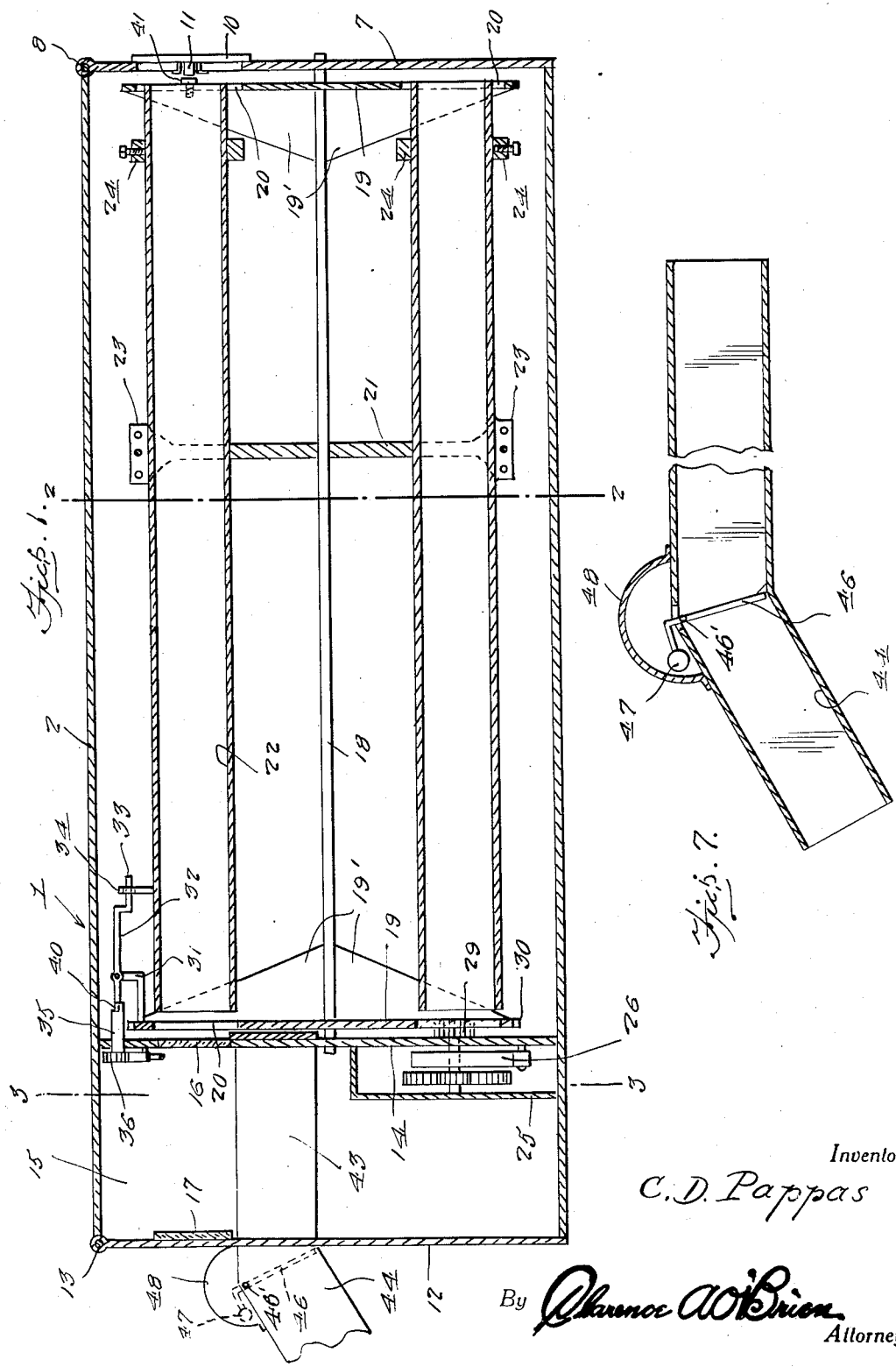
Inventor
C. D. Pappas
By Clarence A. O'Brien
Attorney March 31, 1931.  C. D. PAPPAS  1,798,382
TRAP
Filed May 12, 1930  2 Sheets-Sheet 2
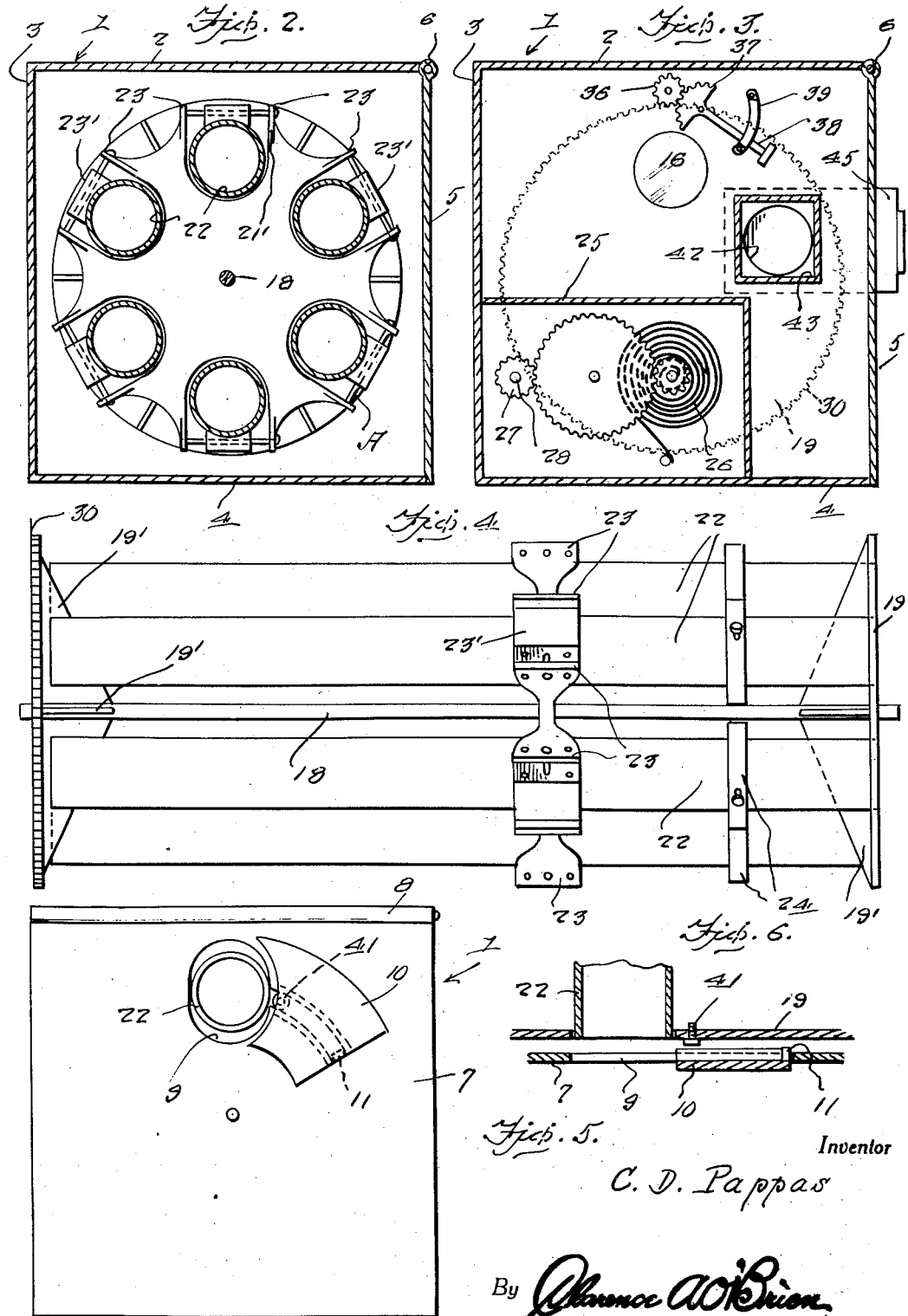
Inventor
C. D. Pappas
By Clarence A. O'Brien
Attorney Patented Mar. 31, 1931

1,798,382

UNITED STATES PATENT OFFICE

CHRIS D. PAPPAS, OF SHAWMUT, MONTANA

TRAP

Application filed May 12, 1930. Serial No. 451,680.

This invention relates to new and useful improvements in traps and has for one of its objects to provide, in a manner as hereinafter set forth, a trap embodying means whereby a plurality of various kinds of animals, birds or fish may be imprisoned therein and segregated from one another.

Another important object of the invention is to provide a trap which will be entirely automatic in its operation and the invention aims further to provide a trap of the aforementioned character which will capture the animals, birds or fish without injury to the same.

A further important object of the invention is to provide a trap embodying novel actuating and trigger releasing mechanism whereby the trap will work equally well when turned up-side-down.

Other objects of the invention are to provide a trap of the aforementioned character which will be simple in construction, strong, durable, efficient in its use and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1 is a vertical longitudinal sectional view of a trap constructed in accordance with this invention.

Figure 2 is a vertical cross sectional view taken substantially on the line 2—2 of Figure 1.

Figure 3 is a vertical cross sectional view taken substantially on the line 3—3 of Figure 1.

Figure 4 is a detail view in longitudinal side elevation showing the rotary carriage with the series of gravity actuated imprisoning tubes mounted thereon.

Figure 5 is a view in elevation showing the entrance end of the trap.

Figure 6 is a fragmentary horizontal sectional view showing the closure for the entrance opening in the casing and the operating means therefor.

Figure 7 is a detail view in longitudinal section of the exit tube and the gravity actuated door therein.

Referring to the drawings in detail, it will be seen that the reference numeral 1 designates generally an elongated rectangular casing of any suitable material, preferably metal, and comprising a top wall 2, a longitudinal side wall 3, a bottom wall 4. The casing or housing 1 is open on one side and said open side is closed by a door 5 which is hingedly mounted as at 6 on the adjacent longitudinal edge of the top wall 2 of the casing. The entrance end of the casing is closed by a door 7 which is hinged as at 8 and provided with an entrance opening 9 adjacent its upper side. A closure plate 10 for the opening 9 is slidably supported in an arcuate slot provided therefor in the door 7 and has a lug 11 projecting from one end thereof through the slot for a purpose to be presently set forth. The opposite end of the casing or housing 1 is closed by a door 12 hinged at 13 and a partition wall 14 is mounted in the casing 1 in spaced relation to the door 12 in a manner to provide a compartment 15. The partition 14 is provided with a window 16 in longitudinal alignment with the entrance opening 9 in the door 7 and a mirror 17 is mounted on the inner side of the door 12 in longitudinal alignment with the window 16 and opening 9 in order that said mirror may be viewed therethrough.

A shaft 18 has its opposite end portions journaled for rotation centrally through the door 7 and the partition 14 and fixed on the opposite end portions of said shaft 18 inwardly of the door 7 and the partition 14 are the circular metallic discs 19 each having a series of circumferentially spaced openings 20 therein, the openings in said discs being in longitudinal alignment with each other and adapted to be successively brought into alignment with the entrance opening 9 and the window 16 upon rotation of the shaft 18 with said discs. Substantially triangular gussets 19' are secured to the opposite end portions of the shaft 18 and to the inner side of the discs 19 to strengthen and rigidify said discs.

At an intermediate point on the shaft 18 which is slightly closer to the door 7 than to the partition 14 there is provided a plate 21 having a series of circumferentially spaced substantially U-shaped recesses 21' in its periphery through which extends transversely the elongated tubes 22 which are of uniform diameter throughout and are open at their opposite ends. The tubes 22 are supported for swinging movement in the recesses 21' of the plate 21 through the medium of the longitudinally extending apertured ears 23 which are formed on the plate on opposite sides of each recess. Hanger blocks 23' are fixed on each tube and have a series of transverse openings therein in alignment with the openings in the ears 23 for the passage of a removable pivot pin A. The pins A are selectively inserted through the openings for regulating the balance of the tubes 18. An annular counterweight 24 is adjustably mounted on each tube 22 on the end portion thereof adjacent the door 7.

A housing 25 is provided in the compartment 15 and mounted therein is a conventional spring motor 26 which is operatively connected to drive a gear 27 (see Figure 3) which is fixed on a shaft 28 journaled through the partition 14 and having a gear 29 fixed on its opposite end which meshes with the gear teeth 30 formed on the periphery of the adjacent disc 19. The spring motor 26 is adapted to rotate the unit illustrated in detail in Figure 4 of the drawings in a clockwise direction in the casing.

Above the forward end portion of each of the tubes 22 is a bracket 31 which is mounted on the inner side of the disc 19 which is adjacent the partition 14 and said bracket is substantially L-shaped and has pivotally mounted on its free end portion a trigger 32 having an offset end portion 33 extending loosely through an apertured ear 34 which extends outwardly from each tube 22. A stop member 35 is rotatably mounted through the partition 14 adjacent the upper edge thereof and is adapted to be engaged successively by each of the triggers 32 to releasably retain the rotary unit against rotation. The end of the stop member 35 which is disposed in the chamber 15 has fixed thereon a pinion gear 36 which is in mesh with a segment 37 which is pivotally mounted on the partition 14 and has a weighted arm 38 fixed thereto for swinging movement in the guide 39 which is also mounted on the partition 14. It may be well to here state that the stop member 35 is provided with a reduced flat extension or end portion 40 extending longitudinally from one end thereof which is engaged by the adjacent end of the trigger 32.

Threaded for adjustment through the disc 19 which is adjacent the door 7 is a headed screw 41 which, when threaded outwardly from said disc is adapted for abutting engagement with the lug 11 on the sliding closure plate 10 in a manner to move the same to closed position over the entrance opening 9 at the end of each complete revolution of the tube unit.

In use, the animals, birds or fish are attracted by the bait (not shown) which may be deposited in any part of the housing 1 and pass through the entrance opening 9 into the tube 22 which is in alignment therewith. When approaching the entrance opening 9 the animal, bird or fish will see its image in the mirror 17 on the inner side of the door 12 and as it passes into the tube 22 will be further attracted toward the opposite end thereof by this means. When the animal, bird or fish passes the pivot point of the tube 22 and before it reaches the opposite end thereof said tube will swing by gravity under the weight of the victim in a manner to move the forward end thereof downwardly and swing the forward end of the trigger 32 upwardly out of engagement with the stop member 35 and the spring motor 26 rotates the entire rotatable unit until the trigger member on the next tube engages the stop member 35. In this position, the partition 14 and the door 7 will be disposed over the opposite ends of the tube which the victim has entered in a manner to close the said tube and imprison said victim. The trap is then ready for the next victim.

When the trap is set, the tube which is adjacent the screw 41 should be disposed in alignment with the entrance opening 9 and thus when the tube unit has made one complete revolution and each of the tubes 22 is occupied, said screw 41 is unthreaded to its operative position, will engage with the lug 11 and close the entrance opening 9 to prevent the escape of the victim which entered the first tube. It will further be apparent that after the sliding closure plate 10 is in closed position, further rotation of the tube unit will be positively prevented by reason of the abutting engagement of the screw 41 with said lug 11. When used in this manner, the capacity of the trap is equal to the number of tubes embodied therein.

Should it be desired to capture a comparatively large number of victims through the medium of the trap, an opening 42 is provided in the partition wall 14 with which a polygonal tube 43 communicates, said tube 43 extending longitudinally across the compartment 15 and projecting through the door 12 and terminating in a downwardly directed outlet end portion 44 disposed forwardly of the housing 1. The tube 43 is supported by the door 12 and the inner end thereof is disposed in abutting engagement with the partition 14. A suitable cage or enclosure (not shown) is to be constructed at the forward end of the trap into which the end portions 44 extend. A slidable closure plate 45 is mounted for manual operation between the partition 14 and the adjacent disc 19 for controlling the opening 42.

A one way outwardly swinging door 46 is hingedly mounted as at 46' in the angle of the tube 43 to prevent the return of the animals through said tube. A counterweight 47 is operatively connected with the door 46 in a manner to assure the closing thereof after the victim has passed outwardly therethrough. A substantially dome-shaped casing 48 is mounted on the tube 43 and disposed over the counterweight 47 in a manner to protect the same.

Should the trap be turned up-side-down, the stop member 35 with the reduced trigger engaging portion 40 thereon will be rotated one half of a revolution through the medium of the pinion gear 36, the segment 37 and the gravity actuated weighted arm 38, in order that the said trigger engaging portion 40 will be properly positioned to receive the triggers thereagainst.

When the trap is to be used for catching fish, transparent abutments (not shown) are to be disposed in the tubes 22 for the fish to strike against in passing therethrough and thus swing said tubes and disengage the trigger from the stop member. It is understood, of course, that the abutments are to be placed in the end portion of the tube which is to swing downwardly.

It is believed that the many advantages of a trap constructed in accordance with this invention will be readily understood, and although the preferred embodiment of the invention is as illustrated and described, it is to be understood that changes in the details of construction may be had which will fall within the scope of the invention as claimed.

What is claimed is:—

1. A trap of the character described comprising a casing having an entrance opening, a series of tubes mounted for rotation in the casing and adapted to register successively with the opening, said tubes pivotally mounted for gravity actuation by the weight of the victim, means for rotating the tubes in the casing, and means operatively connected to said tubes for actuation by the pivotal movement thereof to releasably retain the same in registry with the entrance opening.

2. A trap of the character described comprising a casing having an entrance opening in one end thereof, a partition disposed in the casing in spaced relation to the opposite end thereof forming a base receiving compartment therein and having an opening in alignment with the entrance opening, a series of open end tubes mounted for rotation in the casing and normally disposed in alignment with the openings, said tubes pivotally mounted for gravity actuation by the weight of the victim, means for rotating the tubes in the casing and a trigger mounted in the casing and operatively connected to each tube for actuation by the pivotal movement thereof in a manner to releasably retain said tube in alignment with the openings.

3. A trap of the character described comprising a casing having an entrance opening in one end, a partition disposed in the casing in spaced relation to the opposite end thereof and forming a base receiving compartment therein and having an opening in alignment with the entrance opening, a longitudinally extending shaft mounted for rotation in the casing, a plurality of arms fixed to an intermediate portion of the shaft and extending radially therefrom, elongated open end tubes pivotally mounted for swinging movement on the arms, said tubes adapted for gravity actuation by the weight of the victim, said tubes being further adapted to be brought successively into alignment with the entrance opening and the opening in the partition, means for rotating the tubes in a manner to align the same with the openings, a stop member mounted on the partition adjacent the opening therein, and a trigger member mounted in the casing adjacent each tube for rotation therewith and operatively connected thereto for actuation by the pivotal movement thereof, said trigger member adapted to engage with the stop member in a manner to retain the respective tube in alignment with the opening and adapted to disengage from said stop member upon pivotal movement of the tube in a manner to permit the same to be rotated in the casing.

4. A trap of the character described comprising a casing having an entrance opening in one end, a series of spaced, parallel tubes mounted shiftably in the casing, means for shifting the tubes, supporting means for the tubes operatively connected to the shifting means for actuation thereby, a closure plate for the entrance opening, and coacting means carried by said plate and the tube supporting means for moving the plate to closed position after each tube has been in alignment with the entrance opening.

5. A trap of the character described comprising a casing having an entrance opening in one end, a slidable closure plate for the entrance opening mounted on the casing, a shaft rotatably mounted and disposed longitudinally in the casing, a pair of discs fixed on opposite end portions of the shaft for rotation therewith, a plate fixed on an intermediate portion of the shaft for rotation therewith, a series of tubes mounted for rocking movement in circumferentially spaced relation on the plate and disposed concentrically with respect to the shaft, the discs having spaced openings therein in alignment with the tubes, means controlled by a victim entering the trap for periodically rotating the shaft in a manner to successively bring the tubes into alignment with the entrance opening, and coacting means carried by one of the discs and the slidable plate for shifting said plate to closed position over the entrance opening after each of the tubes have been in alignment therewith.

6. A trap of the character described comprising a casing having an entrance opening in one end and an exit opening in its opposite end disposed out of longitudinal alignment with the entrance opening, a shaft rotatably mounted and disposed longitudinally in the casing, a series of tubes mounted concentrically for rocking movement on the shaft and rotatable therewith, means controlled by a victim entering the trap for periodically rotating the tube in a manner to successively bring the same first into alignment with the entrance opening and then into alignment with the exit opening, and a non-return closure operatively associated with the exit opening.

In testimony whereof I affix my signature.

CHRIS D. PAPPAS.